United States Patent
Lehtiniemi et al.

(10) Patent No.: US 12,342,156 B2
(45) Date of Patent: Jun. 24, 2025

(54) SUPPLEMENTING CONTENT

(71) Applicant: Nokia Technologies Oy, Espoo (FI)

(72) Inventors: Arto Lehtiniemi, Lempaala (FI); Sujeet Shyamsundar Mate, Tampere (FI); Toni Makinen, Pirkkala (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 184 days.

(21) Appl. No.: 17/928,980

(22) PCT Filed: May 27, 2021

(86) PCT No.: PCT/FI2021/050383
§ 371 (c)(1),
(2) Date: Dec. 1, 2022

(87) PCT Pub. No.: WO2021/245328
PCT Pub. Date: Dec. 9, 2021

(65) Prior Publication Data
US 2023/0224664 A1    Jul. 13, 2023

(30) Foreign Application Priority Data
Jun. 4, 2020    (FI) ..................... 20205581

(51) Int. Cl.
*H04S 7/00*     (2006.01)
*H04R 5/04*    (2006.01)

(52) U.S. Cl.
CPC ............... *H04S 7/303* (2013.01); *H04R 5/04* (2013.01); *H04R 2420/07* (2013.01); *H04S 2420/01* (2013.01)

(58) Field of Classification Search
CPC ....... H04S 7/303; H04S 2420/01; H04R 5/04; H04R 2420/07

(Continued)

(56) References Cited

U.S. PATENT DOCUMENTS 5,812,688 A * 9/1998 Gibson ................ G10H 1/0008
381/119
6,011,851 A * 1/2000 Connor ................... H04S 1/002
379/202.01

(Continued)

FOREIGN PATENT DOCUMENTS

EP    3591503 A1    7/2018

OTHER PUBLICATIONS

Indans, R. et al., "Towards an Audio-Locative Mobile Application for Immersive Storytelling," KN-Journal of Cartography and Geographic Information, Mar. 8, 2019.

*Primary Examiner* — William J Deane, Jr.
(74) *Attorney, Agent, or Firm* — McCarter & English, LLP

(57) ABSTRACT

An apparatus, method and computer program product for: providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

20 Claims, 3 Drawing Sheets

(58) Field of Classification Search
USPC .......................................... 381/303, 306, 1
See application file for complete search history.

(56) References Cited

U.S. PATENT DOCUMENTS

| | | |
|---|---|---|
| 2004/0104934 A1 | 6/2004 | Fager et al. |
| 2014/0115468 A1* | 4/2014 | Guerrero ............... G06F 3/0488 |
| | | 715/716 |
| 2015/0373477 A1* | 12/2015 | Norris .................... H04S 1/007 |
| | | 381/303 |
| 2016/0266386 A1* | 9/2016 | Scott ....................... G06F 3/017 |
| 2017/0359467 A1* | 12/2017 | Norris ................... G10L 21/028 |
| 2018/0098173 A1* | 4/2018 | van Brandenburg ........................ |
| | | G10L 19/008 |
| 2020/0053464 A1 | 2/2020 | Peters |

\* cited by examiner

SUPPLEMENTING CONTENT

CROSS REFERENCE TO RELATED APPLICATION

This patent application is a U.S. National Stage application of International Patent Application Number PCT/FI2021/050383 filed May 27, 2021, which is hereby incorporated by reference in its entirety, and claims priority to FI 20205581 filed Jun. 4, 2020.

TECHNICAL FIELD

The present application relates generally to supplementing content. More specifically, the present application relates to supplementing audio content.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

According to a second aspect of the invention, there is provided a method comprising providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

According to a third aspect of the invention, there is provided a computer program comprising instructions for causing an apparatus to perform at least the following: providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

According to a fourth aspect of the invention, there is provided an apparatus comprising at least one processor and at least one memory including computer program code, the at least one memory and the computer program code configured to with the at least one processor, cause the apparatus at least to: provide spatial audio content for output via at least one loudspeaker, determine a position of at least one audio device operatively connected to the at least one loudspeaker, provide, in response to determining that the position of the at least one audio device corresponds to an audio zone associated with additional spatial audio content, the additional spatial audio content for output via the at least one audio device, receive an instruction to include the additional spatial audio content in the spatial audio content, and supplement, in response to receiving the instruction to include the additional spatial content in the spatial audio content, the spatial audio content with the additional spatial audio such that the additional spatial audio content is provided for output independent of the audio zone.

According to a fifth aspect of the invention, there is provided a non-transitory computer readable medium comprising program instructions for causing an apparatus to perform at least the following: providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

According to a sixth aspect of the invention, there is provided a computer readable medium comprising program instructions for causing an apparatus to perform at least the following: providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

BRIEF DESCRIPTION OF THE DRAWINGS

Some example embodiments will now be described with reference to the accompanying drawings.

DETAILED DESCRIPTION

Figure 1:
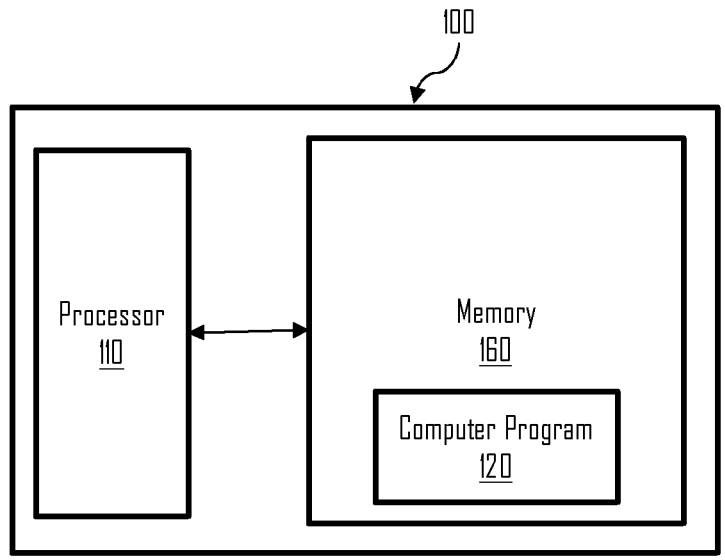
FIG. 1 shows a block diagram of an example apparatus in which examples of the disclosed embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to providing spatial audio content for output via at least one loudspeaker, determining a position of at least one audio device operatively connected to the at least one loudspeaker, providing, in response to determining that the position of the at least one audio device corresponds to an audio zone associated with additional spatial audio content, the additional spatial audio content for output via the at least one audio device, receiving an instruction to include the additional spatial audio content in the spatial audio content, and supplementing, in response to receiving the instruction to include the additional spatial content in the spatial audio content, the spatial audio content with the additional spatial audio such that the additional spatial audio content is provided for output independent of the audio zone.

Some example embodiments relate to previewing spatial audio content without disturbing other users.

Spatial audio may comprise a full sphere surround-sound to mimic the way people perceive audio in real life. Spatial audio may comprise audio that appears from a user's position to be assigned to a certain direction and/or distance. Therefore, the perceived audio may change with the movement of the user or with the user turning. Spatial audio may comprise audio created by sound sources, ambient audio or a combination thereof. Ambient audio may comprise audio that might not be identifiable in terms of a sound source such as traffic humming, wind or waves, for example. The full sphere surround-sound may comprise a spatial audio field and the position of the user or the position of the capturing device may be considered as a reference point in the spatial audio field. According to an example embodiment, a reference point comprises the centre of the audio field.

Spatial audio content may comprise signals or data representing sounds which may be rendered in a three-dimensional (3D) space. Spatial audio may comprise, for example, a three-degrees-of-freedom (3DoF) or a six-degrees-of-freedom (6DoF) audio scene that gives a user a possibility to move in the 3D space by rotating or translating their position such that the user perceives sounds that change depending on the user's position and/or orientation. Therefore, spatial audio content may provide a user with an immersive experience.

Providing spatial audio using traditional music consumption equipment such as wireless loudspeakers is challenging, because traditional music consumption equipment does not allow for tracking a user's position. Further, there is no satisfactory solution for customizing spatial audio using traditional music consumption equipment for a single user.

FIG. 1 is a block diagram depicting an apparatus 100 operating in accordance with an example embodiment of the invention. The apparatus 100 may be, for example, an electronic device such as a chip or a chipset. The apparatus 100 comprises one or more control circuitry, such as at least one processor 110 and at least one memory 160, including one or more algorithms such as computer program code 120 wherein the at least one memory 160 and the computer program code are 120 configured, with the at least one processor 110 to cause the apparatus 100 to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus 100.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code 120 may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
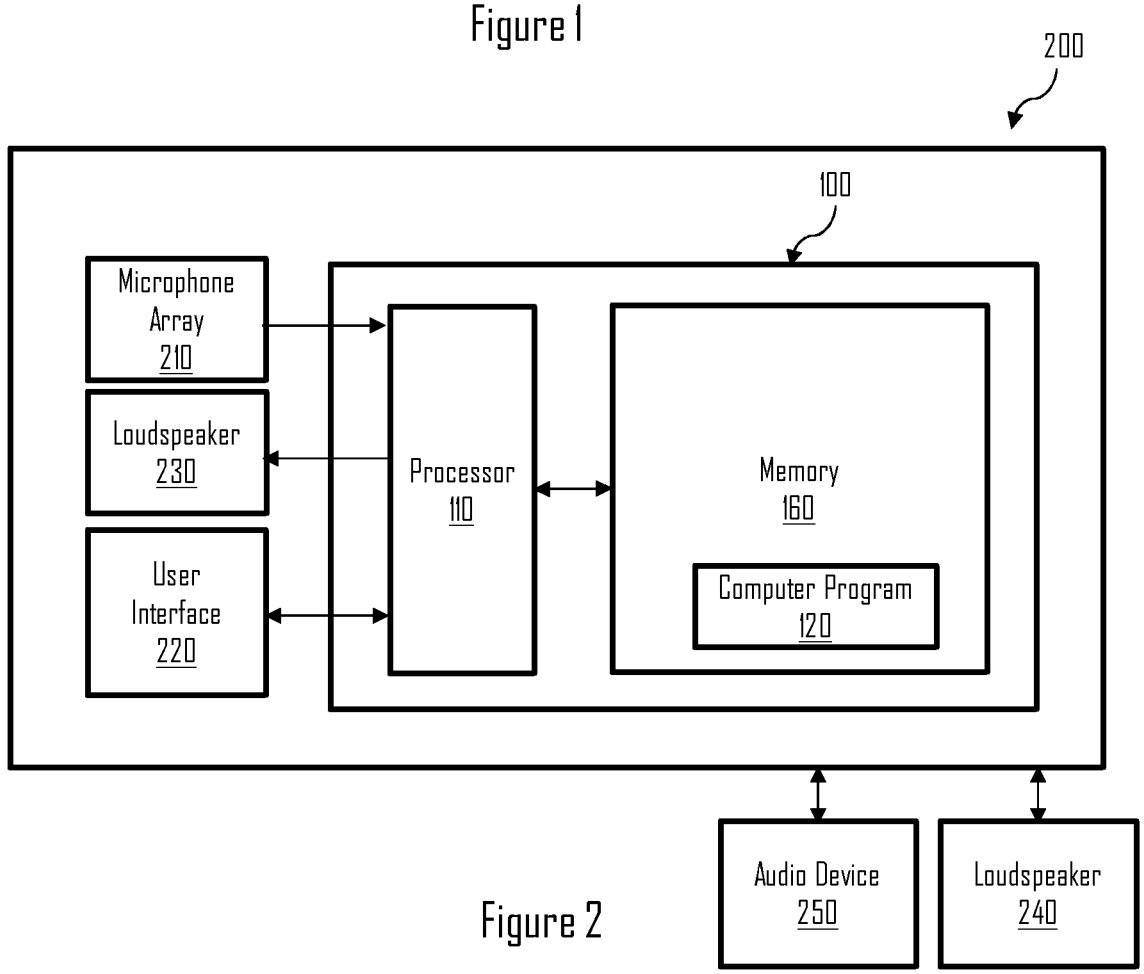
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a loudspeaker, a CD-, DVD or Blu-ray player, or a media player.

In the example embodiment of FIG. 2, the apparatus 200 is illustrated as comprising the apparatus 100, a one or more microphones 210, one or more loudspeakers 230 and a user interface 220 for interacting with the apparatus 200 (e.g. a mobile computing device). The apparatus 200 may also comprise a display configured to act as a user interface 220. For example, the display may be a touch screen display. In an example embodiment, the display and/or the user interface 220 may be external to the apparatus 200, but in communication with it.

The user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a camera, a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

According to an example embodiment, the apparatus 200 is configured to establish radio communication with at least one device using, for example, a Bluetooth, WiFi, radio frequency identification (RFID), or a near field communication (NFC) connection. For example, the apparatus 200 may be configured to establish radio communication with at least one loudspeaker 240 and at least one audio device 250. The at least one loudspeaker 240 may comprise, for example, a wireless loudspeaker and the audio device 250 may comprise, for example, a wireless headphone, augmented/virtual reality device or the like.

The apparatus 200 may be a separate device such as a computer operatively connected with the at least one loudspeaker 240 and the at least one audio device 250. However, in some examples the apparatus 200 may comprise the audio device 250 or the at least one loudspeaker 240 in addition to or instead of the loudspeaker 230.

According to an example embodiment, the apparatus 200 is operatively connected to at least one loudspeaker 240. The apparatus 200 may be connected to the at least one loudspeaker via a wireless connection such as a Bluetooth connection. The at least one loudspeaker may comprise, for example, a wireless loudspeaker such as a Bluetooth loudspeaker.

According to an example embodiment, the apparatus 200 is configured to communicate with the at least one loudspeaker 240. Communicating with the at least one loudspeaker may comprise providing to and/or receiving information from the at least one loudspeaker 240. According to an example embodiment, communicating with the at least one loudspeaker 240 comprises providing audio signals to the at least one loudspeaker.

According to an example embodiment, the at least one loudspeaker 240 is located in a 3D-space. According to an example embodiment, the 3D-space comprises a physical structure such as a room or a building.

According to an example embodiment, the apparatus 200 is configured to provide spatial audio content for output via the at least one loudspeaker. Providing spatial audio content may comprise providing signals or data representing sounds which may be rendered in the three-dimensional (3D) space.

The at least one loudspeaker 240 is configured to render signals or data representing sounds in the 3D-space for providing a 6DoF audio scene thereby enabling an immersive audio experience for a user located in the 3D space. The at least one loudspeaker 240 may be configured as a primary output device for outputting spatial audio content in the 3D space.

According to an example embodiment, the spatial audio content comprises a six-degrees-of-freedom audio scene.

Six-degrees-of-freedom (6DoF) refers to a freedom of movement of a rigid body in a three-dimensional space. The rigid body is free to change position as forward/backward (surge), up/down (heave), left/right (sway) in three perpendicular axes, combined with changes in orientation through rotation about three perpendicular axes termed as yaw (normal axis), pitch (transverse axis) and roll (longitudinal axis).

Referring back to FIG. 2, according to an example embodiment, the apparatus 200 is operatively connected to at least one audio device 250. According to an example embodiment, the apparatus 200 is wirelessly connected to the at least one audio device 250. For example, the apparatus 200 may be connected to the at least one audio device 250 over a Bluetooth connection, or the like.

The at least one audio device 250 may comprise at least one microphone for capturing audio signals and at least one loudspeaker for playing back received audio signals. The audio device 250 may further be configured to filter out background noise and/or detect in-ear placement. The audio device 250 may comprise a headphone such as a wireless headphone.

A headphone may comprise a single headphone such as an ear bud or a pair of headphones such as a pair of ear buds configured to function as a pair. For example, the audio device 250 may comprise a first wireless headphone and a second wireless headphone such that the first wireless headphone and the second wireless headphone are configured to function as a pair. Functioning as a pair may comprise, for example, providing stereo output for a user using the first wireless headphone and the second wireless headphone. The first wireless headphone and the second wireless headphone may also be configured such that the first wireless headphone and the second wireless headphone may be used separately and/or independently of each other. For example, same or different audio information may be provided to the first wireless headphone and the second wireless headphone, or audio information may be directed to one wireless headphone and the second wireless headphone may act as a microphone.

According to an example embodiment, the apparatus 200 is configured to communicate with the audio device 250. Communicating with the audio device 250 may comprise providing to and/or receiving information from the audio device 250. According to an example embodiment, communicating with the audio device 250 comprises providing audio signals and/or receiving audio signals. For example, the apparatus 200 may be configured to provide audio signals to the audio device 250 and receive audio signals from the audio device 250.

Further, the at least one loudspeaker 240 and the at least one audio device 250 may be operatively connected such that they are configured to communicate with each other. The at least one loudspeaker 240 and the at least one audio device 250 may be connected directly or indirectly via the apparatus 200, for example.

According to an example embodiment, the apparatus 200 is configured to determine a position of the at least one audio device 250 operatively connected to the at least one loudspeaker 240. According to an example embodiment, the position of the at least one audio device 250 comprises a position of the at least one audio device 250 with respect to the at least one loudspeaker 240.

The at least one audio device 250 may be configured as a secondary output device for outputting spatial audio content in the 3D space. A secondary output device may comprise an audio device that is configured to provide supplementary and/or customized spatial audio content in addition to the spatial audio content provided by the at least one loudspeaker 240.

The apparatus 200 may be configured to determine the position of the at least one audio device based on information relating to a wireless connection between the at least one loudspeaker 240 and the at least one audio device 250.

According to an example embodiment, the apparatus 200 is configured to receive information relating to the wireless connection between the at least one loudspeaker 240 and the at least one audio device 250, and determine the position of the audio device 250 based on the information relating to the wireless connection between the at least one loudspeaker 240 and the at least one audio device 250. According to an example embodiment, the wireless connection comprises a Bluetooth connection.

According to an example embodiment, the apparatus 200 is configured to determine the position of the audio device 250 using Bluetooth technology such as Bluetooth Low Energy (BLE). The apparatus 200 may be configured to track the position of the at least one audio device 250 using direction of arrival of the Bluetooth connection and signal strength between the at least one loudspeaker 240 and the at least one audio device 250.

Using Bluetooth technology for determining the position of the audio device may comprise measuring the angle-of-departure (AoD) or angle-of-arrival (AoA) comprising measuring both azimuth and elevation angles.

According to an example embodiment, the audio device 250 comprises at least one Bluetooth antenna for transmitting data and the at least one loudspeaker 240 comprises an array of phased antennas for receiving and/or transmitting data. The array of phased antennas may be configured to measure the angle-of-departure (AoD) or angle-of-arrival (AoA) comprising measuring both azimuth and elevation angles.

When performing AoA measurement, the apparatus 200 may be configured control the at least one loudspeaker 240 to execute antenna switching when receiving an AoA packet from the audio device 250. The apparatus 200 may then utilize the amplitude and phase samples together with the at least one loudspeaker's 240 antenna array information to estimate the AoA of a packet received from the audio device 250.

According to another example embodiment, the at least one loudspeaker 240 comprises at least one Bluetooth antenna for transmitting data and the audio device 250 comprises an array of phased antennas for receiving and/or transmitting data. The array of phased antennas may be configured to measure the angle-of-departure (AoD) or angle-of-arrival (AoA) comprising measuring both azimuth and elevation angles.

When performing AoA measurement, the apparatus 200 may be configured control the audio device 250 to execute antenna switching when receiving an AoA packet from the at least one loudspeaker 240. The apparatus 200 may then utilize the amplitude and phase samples together with the audio device's 250 antenna array information to estimate the AoA of a packet received from the at least one loudspeaker 240.

Performing AoD measurement may be based on broadcasting by the at least one loudspeaker 240 the AoD signals, location and properties of a Bluetooth beacon that enables the audio device 250 to calculate its own position.

According to another example embodiment, the apparatus 200 is configured to determine the position of the audio device 250 using acoustic localization. Acoustic localization may comprise receiving microphone signals comprising recorded signals from surroundings and determine a time difference of arrival (TDoA) between microphones. TDoA may be determined based on inter-microphone delays that may be determined through correlations and the geometry of a microphone array.

According to a further example embodiment, the apparatus 200 is configured to determine a position of the audio device 250 using Global Positioning System (GPS) coordinates and Bluetooth technology to determine a relative location of the audio device 250.

The apparatus 200 may be configured to adjust rendering of the spatial audio content in response to receiving information that the position of the audio device 250 with respect to the at least one loudspeaker 240 is changed.

According to an example embodiment, the apparatus 200 is configured to determine that the position of the at least one audio device 250 is changed based on a changed direction of arrival of the Bluetooth connection and signal strength between the at least one loudspeaker 240 and the at least one audio device 250.

According to an example embodiment, the apparatus 200 is configured to adjust rendering of the spatial audio content and the additional spatial audio content based on a distance and an angle of the at least one audio device 250 with respect to the at least one loudspeaker 240.

The spatial audio content may be provided in a 3D space such that different or additional content is provided in different parts of the 3D space. In other words, a first part of the 3D space may be associated with first content and a second part of the 3D space may be associated with second content. As another example, a first part of the 3D space may be associated with first content and a second part of the 3D space may be associated with the first content supplemented by second content.

The apparatus 200 may be configured to associate content with an audio zone based on a direction or a location of sound objects. A direction and/or a location of a sound object may be indicated using metadata associated with a sound object in an audio format. A sound object may comprise one or more separate audio channels or a plurality of sound objects may be combined into a single channel such that associated metadata describes which parts of the audio content belong to a particular object.

According to an example embodiment, the different or additional content is mapped to the 3D space relative to the position of the at least one loudspeaker.

According to an example embodiment, the spatial audio content is provided in a 3D space comprising one or more audio zones. The one or more audio zones may be separate audio zones or at least partially overlapping audio zones. An audio zone may be associated with alternative/additional spatial audio content such that when a user is located outside the audio zone, the alternative/additional content might not be rendered for the user, but when the position of the user corresponds with the audio zone, the alternative/additional content may be rendered for the user. A position of the user may comprise a position of at least one audio device 250 the user is wearing.

According to an example embodiment, the apparatus 200 is configured to provide, in response to determining that the position of the at least one audio device 250 corresponds to an audio zone associated with additional spatial audio content, the additional spatial audio content for output via the at least one audio device 250.

A user may move around in the 3D space comprising one or more audio zones associated with alternative/additional spatial audio content such that when the position of the at least one audio device 250 corresponds to at least one audio zone, the alternative/additional spatial audio content associated with the at least one audio zone is played back for the user. Therefore, if the user does not like the alternative/additional spatial audio content associated with an audio zone, the user may move to another audio zone. When the user finds an audio zone associated with alternative/additional spatial audio content the user likes, the user may select the alternative/additional spatial audio content to be played back in addition to the spatial audio content provided for output via the loudspeaker 240.

According to an example embodiment, an audio zone comprises a physical location associated with additional spatial content.

Without limiting the scope of the claims, an advantage of providing the additional spatial audio content for output via the at least one audio device is that the additional spatial audio content may be previewed without affecting the output of the at least one loudspeaker.

According to an example embodiment, the apparatus 200 is configured to receive and instruction to include the additional spatial audio content in the spatial audio content. According to an example embodiment, the instruction to include the additional spatial audio content in the spatial audio content comprises a user input.

Including the additional spatial audio content in the spatial audio content my comprise providing the spatial audio content and the additional spatial audio content for a user via one or more output devices. As another example, including the additional spatial content in the spatial audio content may comprise combining the additional spatial audio content and the spatial audio content. As a further example, including the additional spatial audio content in the spatial audio content may comprise selecting the additional spatial audio content for playback together with the spatial audio content.

According to an example embodiment, the apparatus 200 is configured to supplement, in response to receiving the instruction to include the additional spatial audio content in the spatial audio content, the spatial audio content with the additional spatial audio content such that the additional spatial audio content is provided for output independent of the audio zone.

Providing the additional spatial audio content for output independent of the audio zone comprises providing the additional spatial audio content for output regardless of the position of the at least one audio device 250 in the 3D space.

Without limiting the scope of the claims, an advantage of providing the additional spatial audio content for output independent of the audio zone is that the additional spatial audio content may be fixed for output. In other words, the additional spatial audio content may be provided also outside the audio zone.

According to an example embodiment, supplementing the spatial audio content with the additional spatial audio content comprises providing the spatial audio content and the additional spatial audio content for output via the at least one loudspeaker 240.

Without limiting the scope of the claims, an advantage of providing the spatial audio content and the additional spatial audio content for output via the at least one loudspeaker is that a user may freely move and still hear to additional spatial audio content associated with an audio zone.

According to another example embodiment, supplementing the spatial audio content with the additional spatial audio content comprises providing the spatial audio content for output via the at least one loudspeaker 240 and providing the additional spatial audio content for output via the at least one audio device 250.

Without limiting the scope of the claims, an advantage of providing the spatial audio content for output via the at least one loudspeaker and providing the additional spatial audio content for output via the at least one audio device is that a user may be provided with customized content, independent of content provided for other users.

The apparatus 200 may be configured to control supplementing the spatial audio content with the additional spatial audio content. The apparatus 200 may be configured to control supplementing the spatial audio content with the additional spatial audio content by modifying the spatial audio content, the additional spatial audio content or both the spatial audio content and the additional spatial audio content.

Modifying may comprise adjusting one or more properties of the spatial audio content and/or the additional spatial audio content.

According to an example embodiment, the apparatus 200 is configured to adjust a volume of the additional spatial audio content based on a volume of the spatial audio content. For example, the apparatus 200 may be configured to substantially match the volume of the additional spatial audio content with the volume of the spatial audio content.

According to an example embodiment, the spatial audio content comprises musical content comprising music provided by a plurality of instruments of different types and the additional content comprises musical content comprising music provided by one or more instrument of a single type.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for providing spatial audio content for output via at least one loudspeaker, means for determining a position of at least one audio device operatively connected to the at least one loudspeaker, means for providing, in response to determining that the position of the at least one audio device corresponds to an audio zone associated with additional spatial audio content, the additional spatial audio content for output via the at least one audio device, means for receiving an instruction to include the additional spatial audio content in the spatial audio content, and means for supplementing, in response to receiving the instruction to include the additional spatial content in the spatial audio content, the spatial audio content with the additional spatial audio such that the additional spatial audio content is provided for output independent of the audio zone.

The apparatus 200 may further comprise means for adjusting a volume of the additional spatial audio content based on a volume of the spatial audio content and/or means for adjusting rendering of the spatial audio content and the additional spatial audio content based on a distance and an angle of the at least one audio device with respect to the at least one loudspeaker. The apparatus 200 may further comprise means for receiving information relating to a wireless connection between the at least one loudspeaker and the at least one audio device, and means for determining the position of the audio device based on the information relating to the wireless connection between the at least one loudspeaker and the at least one audio device.

Figure 3:
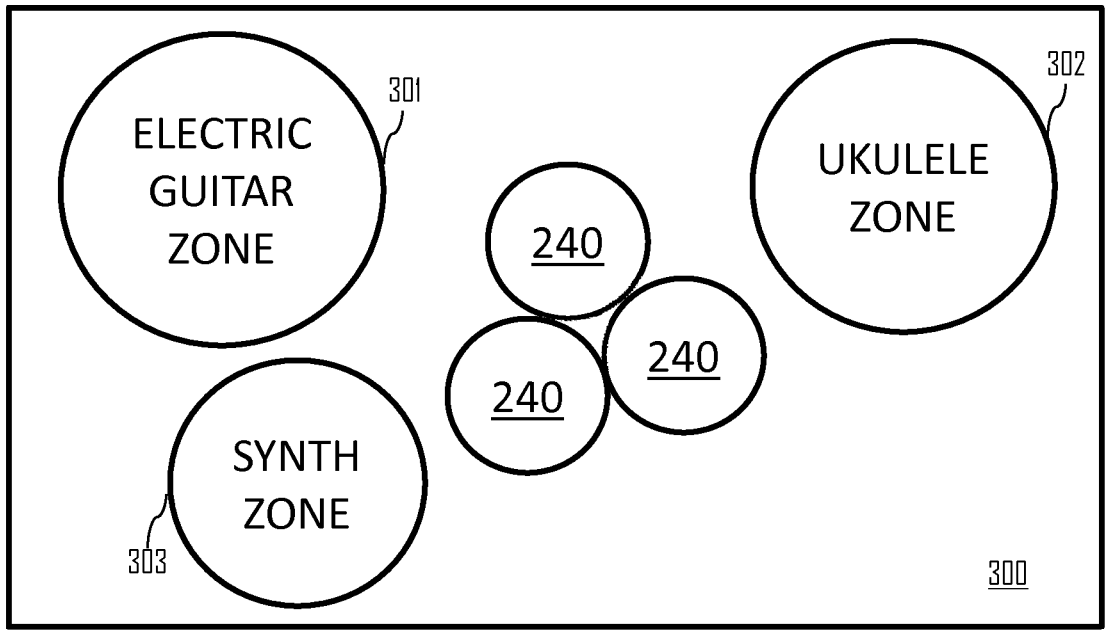
FIG. 3 illustrates an example of a space comprising a plurality of audio zones.

FIG. 3 illustrates an example of a space 300 comprising a plurality of audio zones. In the example of FIG. 3, the space comprises a room comprising a plurality of audio zones mapped to the room. However, it should be noted that the space may comprise a different number of audio zones than what is illustrated in the example of FIG. 3. For example, the space 300 may comprise one, two, four or more audio zones.

A plurality of loudspeakers 240 are provided in the center in the space 300 for rendering spatial audio content provided by the apparatus 200. The plurality of loudspeakers may comprise a plurality of separate loudspeakers or a loudspeaker array comprising a plurality of loudspeaker elements. In the example of FIG. 3, it is assumed that the plurality of loudspeakers 240 provides music comprising a plurality of musical instruments such as a bass and drums.

In the space 300, there are also three audio zones 301, 302 and 303 associated with additional spatial audio content. An audio zone 301, 302, 303 may be associated with one or more audio sources. For example, an audio zone may be associated with a single or single type of an audio source, different types of audio sources, a mix of different audio sources, different arrangements of audio sources, or the like. In the example of FIG. 3, the audio zone 301 comprises an electric guitar zone associated with music provided by one or more electric guitars, the audio zone 302 comprises an ukulele zone associated with music provided by one or more ukuleles, and the audio zone 303 comprises a synthesizer zone associated with music provided by one or more synthesizers.

Figure 4:
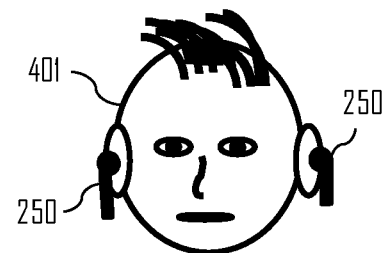
FIG. 4 illustrates an example of a user consuming spatial audio.
Figure 4:
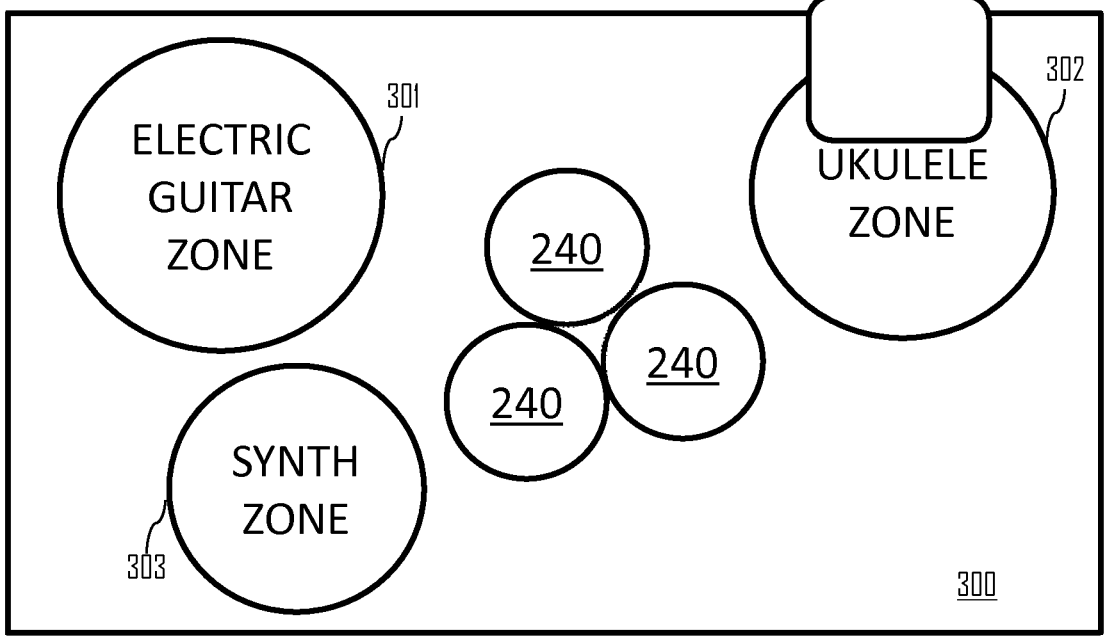

FIG. 4 illustrates an example of a user 401 in the space illustrated in the example of FIG. 3. Similarly to the example of FIG. 3, a plurality of loudspeakers 240 are provided in the center in the space 300 for rendering spatial audio content provided by the apparatus 200. The plurality of loudspeakers may comprise a plurality of separate loudspeakers or a loudspeaker array comprising a plurality of loudspeaker elements. In the example of FIG. 4, it is assumed that the plurality of loudspeakers 240 provides music comprising a plurality of musical instruments such as a bass and drums.

In the space 300, there are also three audio zones 301, 302 and 303 associated with additional spatial audio content. An audio zone 301, 302, 303 may be associated with one or more audio sources. For example, an audio zone may be associated with a single or single type of an audio source, different types of audio sources, a mix of different audio sources, different arrangements of audio sources, or the like. In the example of FIG. 4, the audio zone 301 comprises an electric guitar zone associated with music provided by one or more electric guitars, the audio zone 302 comprises an ukulele zone associated with music provided by one or more ukuleles, and the audio zone 303 comprises a synthesizer zone associated with music provided by one or more synthesizers.

The user 401 is wearing a pair of audio devices 250. The pair of audio devices 250 comprises a pair of wireless ear buds operatively connected to the at least one loudspeaker 240 that renders spatial audio content provided for the at least one loudspeaker 240 by the apparatus 200.

The user 401 may move around in the space 300 comprising the audio zones 301, 302, 303 associated with additional spatial audio content. When the position of the at least one audio device 250 corresponds to an audio zone 301, 302 or 303, the additional spatial audio content associated with the audio zone is played back for the user. Therefore, if the user does not like the additional spatial audio associated with audio zone 301, the user may move to audio zone 302 or 303. When the user finds an audio zone associated with additional spatial audio content the user likes, the user may select the additional spatial audio content to be played back in addition to the spatial audio content provided for output via the plurality of loudspeakers 240.

In the example of FIG. 4, the apparatus 200 determines that the position of at least one audio device 250 corresponds to the audio zone 302 that is associated with ukulele music and provides the ukulele music associated with the audio zone 302 as additional spatial audio content for output via the at least one audio device 250.

In other words, spatial audio content comprising bass and drums is provided for output via the plurality of loudspeakers 240 and the additional spatial audio content is provided for output via the at least one audio device 250.

Figure 5:
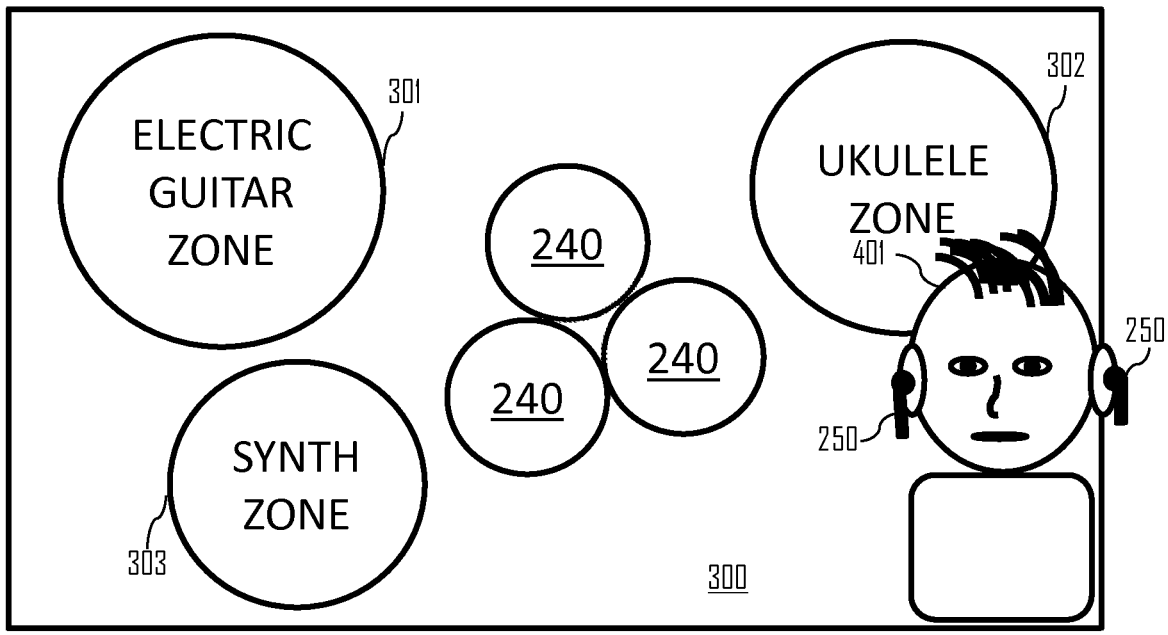
FIG. 5 illustrates another example of a user consuming spatial audio.

FIG. 5 illustrates an example of a user 401 in the space illustrated in the examples of FIG. 3 and FIG. 4. Similarly to the example of FIG. 3 and FIG. 4, a plurality of loudspeakers 240 are provided in the center in the space 300 for rendering spatial audio content provided by the apparatus 200. The plurality of loudspeakers may comprise a plurality of separate loudspeakers or a loudspeaker array comprising a plurality of loudspeaker elements. In the example of FIG. 5, it is assumed that the plurality of loudspeakers 240 provide music comprising a plurality of musical instruments such as a bass and drums.

It is assumed that the user likes the additional spatial audio content associated with ukulele music in the audio zone 302 and wishes to continue hearing the additional spatial audio content associated with the audio zone 302 also outside the audio zone 302. In the example of FIG. 5, the apparatus 200 receives an instruction from the user 401 to include the additional spatial audio content in the spatial audio content and supplements, in response to receiving the instruction to include the additional spatial content in the spatial audio content, the spatial audio content with the additional spatial audio such that the additional spatial audio content is provided for output independent of the audio zone associated for ukulele. In other words, the user 401 may continue moving in the space 300 and hear the additional spatial audio associated with audio zone 302 even if the position of the at least one audio device 250 might not correspond to the position of the audio zone 302.

The apparatus 200 may provide the supplemented spatial audio content via the plurality of loudspeakers 240. Alternatively, the apparatus 200 may provide the additional spatial audio content via the at least one audio apparatus 250 and the spatial audio content via the at least one of audio devices 250.

Figure 6:
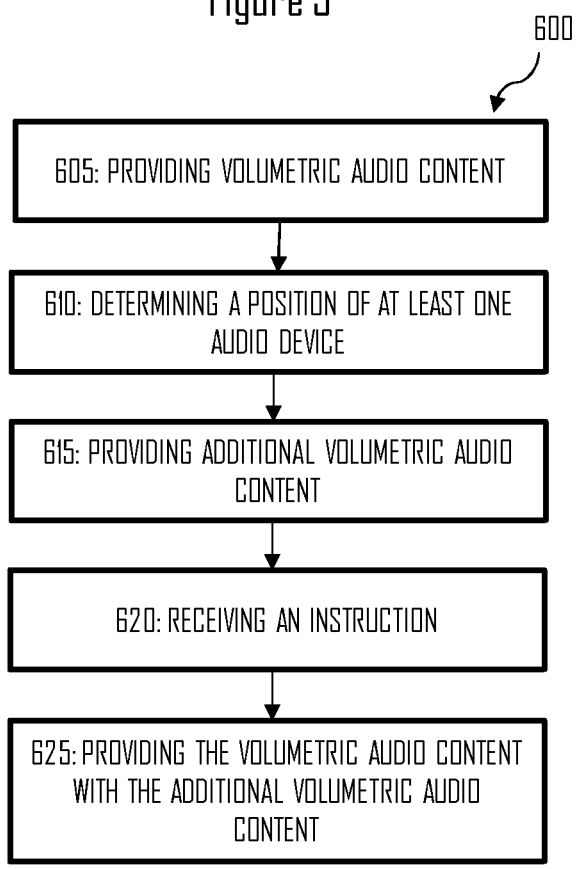
FIG. 6 illustrates an example method.

FIG. 6 illustrates an example method 600 incorporating aspects of the previously disclosed embodiments. More specifically the example method 600 illustrates supplementing spatial audio content with additional spatial audio content. The method may be performed by the apparatus 200.

The apparatus 200 is configured to determine a position of the audio device 250 using Bluetooth technology, acoustic localization and/or GPS coordinates together with Bluetooth technology.

The method starts with providing 605 spatial audio content for output via at least one loudspeaker. The spatial audio content comprises a six-degrees-of-freedom (6DoF) audio scene.

The method continues with determining 610 a position of at least one audio device operatively connected to the at least one loudspeaker. The position of the audio device 250 may comprise a position of the audio device 250 with respect to the at least one loudspeaker 240.

The method further continues with providing 615, in response to determining that the position of the at least one audio device corresponds to an audio zone associated with additional spatial audio content, the additional spatial audio content for output via the at least one audio device. In the example of FIG. 6, an audio zone comprises a physical location associated with additional spatial audio content The method further continues with receiving 620 an instruction to include the additional spatial audio content in the spatial audio content. The instruction to include the additional spatial audio content in the spatial audio content may comprise a user input.

The method further continues with supplementing 625, in response to receiving the instruction to include the additional spatial content in the spatial audio content, the spatial audio content with the additional spatial audio such that the additional spatial audio content is provided for output independent of the audio zone. Supplementing the spatial audio content with the additional spatial audio content may comprise providing the spatial audio content and the additional spatial audio content for output via the at least one loudspeaker or providing the spatial audio content for output via the at least one loudspeaker and providing the additional spatial audio content for output via the at least one audio device.

Without limiting the scope of the claims, an advantage of supplementing the spatial audio content with the additional spatial audio such that the additional spatial audio content is provided for output independent of the audio zone is that richer content may be provided for a user.

Without in any way limiting the scope, interpretation, or application of the claims appearing below, a technical effect of one or more of the example embodiments disclosed herein is that traditional music consumption equipment may be utilized for consuming spatial audio content in a customized manner.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory storing instructions that, when executed with the at least one processor, cause the apparatus at least to:
   provide spatial audio content for output via at least one loudspeaker;
   determine a position of at least one audio device operatively connected to the at least one loudspeaker;
   provide, in response to determining that the position of the at least one audio device corresponds to an audio zone associated with additional spatial audio content, the additional spatial audio content for output via the at least one audio device;
   receive an instruction to include the additional spatial audio content in the spatial audio content whether or not the position of the at least one audio device corresponds to the audio zone; and
   supplement, in response to receiving the instruction to include the additional spatial audio content in the spatial audio content, the spatial audio content with the additional spatial audio content such that the additional spatial audio content is provided for output independent of whether or not the position of the at least one audio device corresponds to the audio zone.

2. The apparatus according to claim 1, wherein supplementing the spatial audio content with the additional spatial audio content comprises the at least one memory stores instructions that, when executed with the at least one processor, cause the apparatus to:
   provide the spatial audio content and the additional spatial audio content for output via the at least one loudspeaker.

3. The apparatus according to any claim 1, wherein supplementing the spatial audio content with the additional spatial audio content comprises the at least one memory stores instructions that, when executed with the at least one processor, cause the apparatus to:
provide the spatial audio content for output via the at least one loudspeaker; and
provide the additional spatial audio content for output via the at least one audio device.

4. The apparatus according to claim 1, wherein the spatial audio content comprises a six-degrees-of-freedom audio scene.

5. The apparatus according to claim 1, wherein the audio zone comprises a physical location associated with the additional spatial audio content.

6. The apparatus according to claim 1, wherein the at least one memory stores instructions that, when executed with the at least one processor, cause the apparatus to:
adjust a volume of the additional spatial audio content based on a volume of the spatial audio content.

7. The apparatus according to claim 1, wherein the at least one memory stores instructions that, when executed with the at least one processor, cause the apparatus to:
adjust rendering of the spatial audio content and the additional spatial audio content based on a distance and an angle of the at least one audio device with respect to the at least one loudspeaker.

8. The apparatus according to claim 1, wherein the spatial audio content comprises musical content comprising music provided by a plurality of instruments of different types and the additional spatial audio content comprises additional musical content comprising additional music provided by one or more instruments of a single type.

9. The apparatus according to claim 1, wherein the position of the at least one audio device comprises a position of the at least one audio device with respect to the at least one loudspeaker.

10. The apparatus according to claim 9, wherein determining the position of the at least one audio device comprises the at least one memory stores instructions that, when executed with the at least one processor, cause the apparatus to:
receive information relating to a wireless connection between the at least one loudspeaker and the at least one audio device; and
determine the position of the at least one audio device based on the information relating to the wireless connection between the at least one loudspeaker and the at least one audio device.

11. The apparatus according to claim 10, wherein the wireless connection comprises a Bluetooth connection.

12. The apparatus according to claim 1, wherein the instruction to include the additional spatial audio content in the spatial audio content comprises a user input.

13. The apparatus according to claim 1, wherein the apparatus comprises the at least one loudspeaker.

14. A method comprising:
providing spatial audio content for output via at least one loudspeaker;
determining a position of at least one audio device operatively connected to the at least one loudspeaker;
providing, in response to determining that the position of the at least one audio device corresponds to an audio zone associated with additional spatial audio content, the additional spatial audio content for output via the at least one audio device;
receiving an instruction to include the additional spatial audio content in the spatial audio content whether or not the position of the at least one audio device corresponds to the audio zone; and
supplementing, in response to receiving the instruction to include the additional spatial audio content in the spatial audio content, the spatial audio content with the additional spatial audio content such that the additional spatial audio content is provided for output independent of whether or not the position of the at least one audio device corresponds to the audio zone.

15. The method according to claim 14, wherein the supplementing of the spatial audio content with the additional spatial audio content comprises:
providing the spatial audio content and the additional spatial audio content for output via the at least one loudspeaker.

16. The method according to claim 14, wherein the supplementing of the spatial audio content with the additional spatial audio content comprises:
providing the spatial audio content for output via the at least one loudspeaker; and
providing the additional spatial audio content for output via the at least one audio device.

17. The method according to claim 14, wherein the spatial audio content comprises a six-degrees-of-freedom audio scene.

18. The method according to claim 14, wherein the audio zone comprises a physical location associated with the additional spatial audio content.

19. The method according to claim 14, further comprising:
adjusting a volume of the additional spatial audio content based on a volume of the spatial audio content.

20. A non-transitory computer readable medium comprising instructions stored thereon for performing at least the following:
providing spatial audio content for output via at least one loudspeaker;
determining a position of at least one audio device operatively connected to the at least one loudspeaker;
providing, in response to determining that the position of the at least one audio device corresponds to an audio zone associated with additional spatial audio content, the additional spatial audio content for output via the at least one audio device;
receiving an instruction to include the additional spatial audio content in the spatial audio content whether or not the position of the at least one audio device corresponds to the audio zone; and
supplementing, in response to receiving the instruction to include the additional spatial audio content in the spatial audio content, the spatial audio content with the additional spatial audio content such that the additional spatial audio content is provided for output independent of whether or not the position of the at least one audio device corresponds to the audio zone.

* * * * *